(12) United States Patent
Miller

(10) Patent No.: US 8,609,750 B1
(45) Date of Patent: Dec. 17, 2013

(54) SELECTIVE CLAY PLACEMENT WITHIN A SILICATE-CLAY EPOXY BLEND NANOCOMPOSITE

(75) Inventor: Sandi G Miller, Cleveland, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 111 days.

(21) Appl. No.: 12/792,380

(22) Filed: Jun. 2, 2010

(51) Int. Cl.
  *C08G 59/20* (2006.01)
  *C08K 3/34* (2006.01)
  *C08L 63/00* (2006.01)

(52) U.S. Cl.
  USPC ............ 523/427; 523/440; 523/443; 523/466

(58) Field of Classification Search
  None
  See application file for complete search history.

(56) References Cited

U.S. PATENT DOCUMENTS

| 3,315,035 | A | * | 4/1967 | Applegath et al. | 348/824 |
| 4,734,468 | A | * | 3/1988 | Marx | 525/524 |
| 5,801,216 | A | * | 9/1998 | Pinnavaia et al. | 523/209 |
| 2005/0107497 | A1 | * | 5/2005 | Akaho et al. | 523/457 |
| 2008/0233386 | A1 | * | 9/2008 | Shibayama et al. | 428/332 |

FOREIGN PATENT DOCUMENTS

JP   2001335680 A   * 12/2001   .............. C08L 63/00

OTHER PUBLICATIONS

Machine translation of JP 2001335680 A, provided by the JPO website (no. date).*

* cited by examiner

*Primary Examiner* — Michael J Feely
(74) *Attorney, Agent, or Firm* — Robert H. Earp, III

(57) ABSTRACT

A clay-epoxy nanocomposite may be prepared by dispersing a layered clay in an alkoxy epoxy, such as a polypropylene oxide based epoxide before combining the mixture with an aromatic epoxy to improve the nanocomposite's thermal and mechanical properties.

11 Claims, 7 Drawing Sheets

710  720

710  720

SELECTIVE CLAY PLACEMENT WITHIN A SILICATE-CLAY EPOXY BLEND NANOCOMPOSITE

ORIGIN OF THE INVENTION

The invention described herein was made by an employee of the United States Government and may be manufactured and used only by or for the Government for Government purposes without the payment of any royalties thereon or therefore.

BACKGROUND

Many epoxy based composites used for structural applications in the aerospace industry are composed of toughened epoxy resins. Epoxy monomers containing aromatic moieties tend to have a greater melt viscosity than the alkoxy based monomers. In addition, epoxy resins composed of solely aromatic epoxy tend to be glassy whereas the flexible alkoxy based epoxy resins tend to be rubbery. Such resins typically exhibit sub-optimal mechanical properties relative to the glassy resins, for example, lower yield stress.

Dispersing an organically modified layered silicate clay in a polymeric matrix to form a nanocomposite may improve the resulting material's mechanical properties including increasing yield stress. However, when such a clay is added to a polymeric matrix, the resulting material may lose properties in other areas such as a decrease in glass transition temperature $T_g$ and reduced ductility and toughness.

BRIEF SUMMARY

Epoxy blended nanocomposites containing both rigid aromatic and flexible alkoxy components were prepared with clay added as a strengthener. The clay was initially dispersed in the polypropylene oxide based epoxide and then combined with an aromatic epoxide to form the blended epoxy resin. The aromatic component of the blend contributes rigidity and higher temperature capability to the material whereas the alkoxy component is the more flexible, mechanically weaker, component of the blend. When a clay is dispersed in the blend of aromatic and alkoxy, the clay tends to reside close to the aromatic components, due to electronic interactions between the aromatic ring and the clay sheet. Addition of clay to the alkoxy based epoxy first, physically places the clay in the toughening, more flexible component of the material, the mobility of the clay is optimized and the mechanically weaker phase is reinforced, thus improving the mechanical properties of the material. Blending epoxies produced both glassy and rubbery nanocomposites at room temperature, depending on the aromatic to alkoxy ratio.

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

Figure 1:
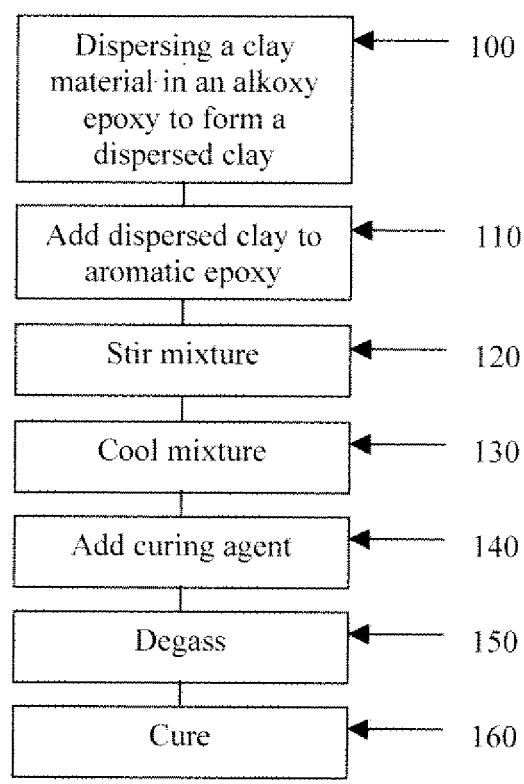
FIG. 1 is a flowchart showing a procedure for making a nanocomposite.

An exemplary method of making a nanocomposite is shown in FIG. 1. An organically modified clay, for example Cloisite 30B, commercially available from Southern Clay products, was combined with a polypropylene oxide based epoxide, for example Araldite DY3601 commercially available from Huntsman Chemicals, and mixed for two hours to allow intercalation of the Araldite DY3601 into the Cloisite 30B galleries producing an intercalated nanocomposite, step 100. After two hours of mixing, an aromatic epoxy resin, for example, Epon 826 commercially available from Resolution Performance Products, was added to the DY3601/clay nanocomposite, step 110. The mixture was stirred, step 120, for three hours and allowed to cool, step 130. Once cool, step 130, a curing agent is added, step 140, for example Jeffamine D230 from Huntsman Chemicals. The mixture was poured into molds, degassed, step 150, at 40° C. for 3 hours and cured under a protocol, step 160, at 75° C. for 2 hours, and then 125° C. for 2 hours. Artisans will appreciate that functionally equivalent substitutions of specific materials may be used.

Nanocomposite samples were prepared without the pre-dispersion step to be used for comparison purposes. Samples with a ratio of 70:30 (aromatic epoxy to alkoxy epoxy) were made by mixing Epon 826 and DY3601 in a jar, followed by stirring at 40° C. Cloisite 30B was added to yield either 2 wt % or 5 wt % clay and the mixture was stirred with a stir bar for 3 hours. The epoxy/clay mixture was cooled and the D230 curing agent was added. The contents of the jar were poured into a 10.2 cm by 10.2 cm mold, degassed at 40° C. for 3 hours, cured at 75° C. for 2 hours and then 125° C. for 2 hours. The above procedure was followed for all comparison (control) samples regardless of their monomer ratio.

The monomer quantities used for the exemplary samples prepared are shown in Table 1.

TABLE 1

| Epoxy Ratio (aromatic:alkoxy) | Aromatic Epon 826 (g) | Alkoxy Araldite DY3601 (g) | Curing Agent D230 (g) |
|---|---|---|---|
| 50:50 | 13.52 | 13.52 | 6.75 |
| 70:30 | 18.4 | 7.875 | 7.5 |
| 90:10 | 22.95 | 2.55 | 8.25 |

Cloisite is derived from layered magnesium aluminum silicate (montmorillonite). Montmorillonite's hydrophilic nature typically resists homogeneous dispersion in an organic polymer. To improve dispersion, the montmorillonite is organically modified by a cation exchange reaction. Specifically, the commercially available clay, Cloisite 30B, is modified with methyl, tallow (~65% C18; ~30% C16; ~5% C14), bis-2-hydroxyethyl, quaternary ammonium chloride; and is believed to have a d-spacing of 1.85 nm. The chemical structure of the Cloisite 30B Modifier is:

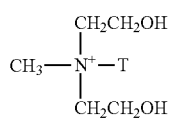

Where T is Tallow (~65% C18, ~30% C16, and ~5% C14)

The chemical structure of Epon 826 is:

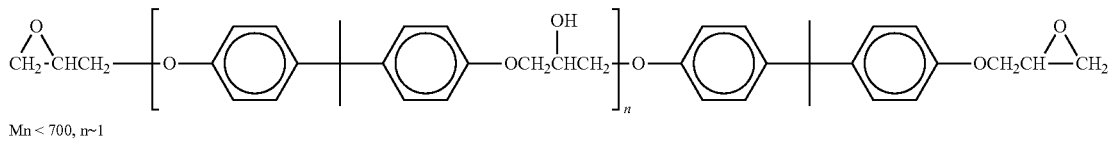

Mn < 700, n~1

The chemical structure of alkoxy based epoxy, Araldite DY3601 is:

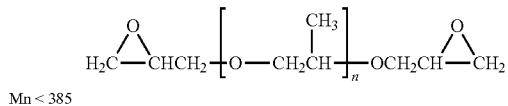

Mn < 385

The chemical structure of the curing agent Jeffamine D230 is:

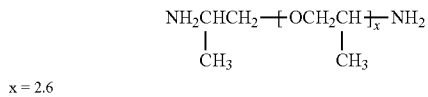

x = 2.6

The structure of the cured nanocomposite:

Where:

depicts the alkoxy component
∕ is the clay
——— is the aromatic component.

Experimental Protocol

X-ray diffraction (XRD) patterns were obtained using a Philips XRG 3100 X-ray diffractometer with Ni-filtered CuK$\alpha$ radiation with the XRD data recorded in the range of $2\theta=2°$ to $32°$. An increase in the basal layer spacing, which was determined from a shift in the (001) peak position, indicated monomer or polymer intercalation between the silicate layers. Disappearance of the (001) peak suggested an exfoliated morphology.

Transmission electron microscopy (TEM) specimens were prepared by microtoming nanocomposite samples, 20 to 70 nm thick, and floating the sections onto Cu grids. Micrographs were obtained with a Philips CM 200 over time, taken from various regions of each nanocomposite sample.

A Perkin Elmer High Pressure Differential Scanning calorimeter (HP-DSC) was used to determine $T_g$ of the epoxy samples. The resin (8-12 mg) was weighed and placed into a sealed aluminum DSC pan. The tests were performed at 200 psi under nitrogen and the temperature was ramped from $-50°$ C. to $250°$ C. at a rate of $10°$ C./min.

Tensile tests were run according to ASTM D638. The tests were performed on an MTS 800 instrument at a displacement rate of 0.55 inch per minute, using a 500 pound load cell. Optical measurement techniques using digital image correlation, as opposed to strain gages, were made using ARAMIS software. In image correlation, a random speckle pattern is painted on the specimen. Cameras then track the displacements of the speckled dots, and displacement fields and strains are calculated by specialized computer algorithms. Once calibrated, the software can measure specimens under loading and output strain and displacement results through automated methods without user intervention being required.

Experimental Results

Figure 2:
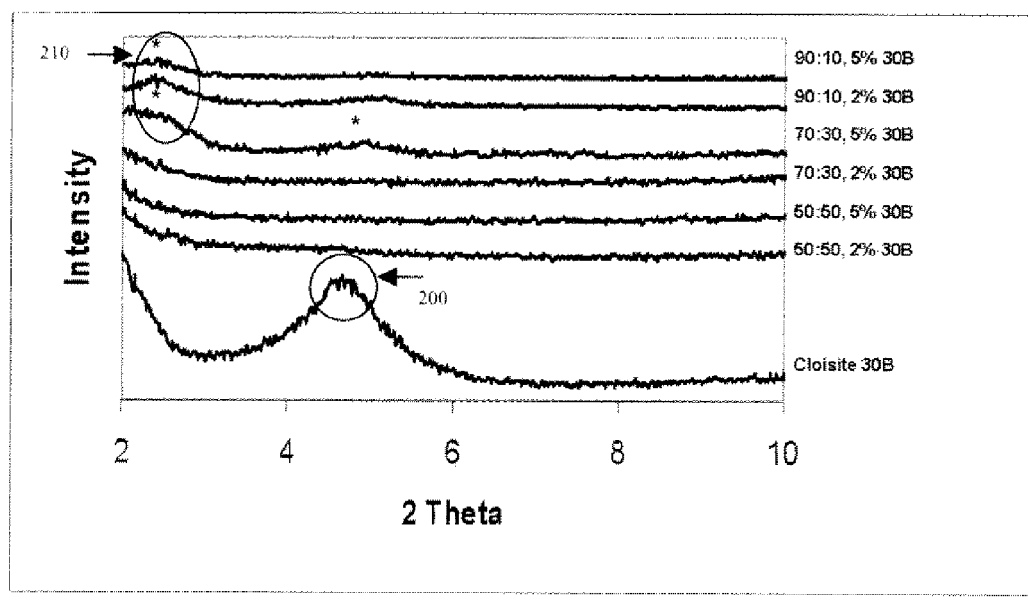
FIG. 2 is a chart of experimental data.

Representative XRD patterns are shown in FIG. 2. The XRD pattern of Cloisite 30B displayed an intense diffraction peak at $2\theta=4.9°$ $d_{001}=1.8$ nm, 200. Within the 50:50 nanocomposites, the XRD pattern suggested exfoliation, based on the absence of a Cloisite 30B diffraction peak. As the content of the alkoxy component within the epoxy blend decreased, intercalation became the prevalent nanostructure. For example, the 70:30 resin containing 5 wt % Cloisite 30B and both (2 wt % and 5 wt % Cloisite 30B) 90:10 nanocomposites exhibited a low intensity diffraction peak at $2\theta=2.51°$, $d_{001}=3.5$ nm, 210 corresponding to intercalated clay.

Figure 3:
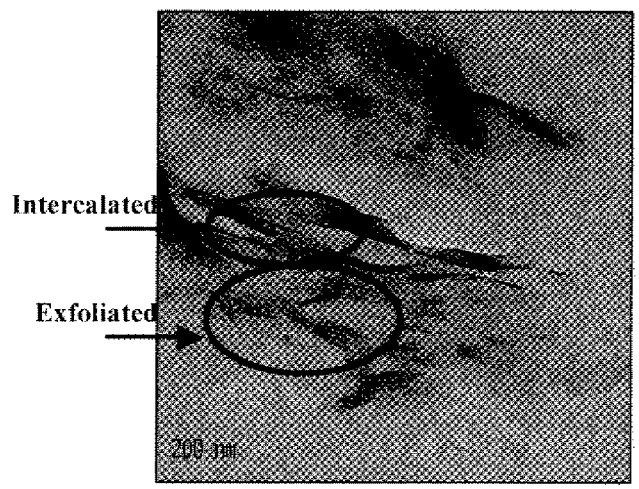
FIG. 3 shows TEM photographs.
Figure 3:
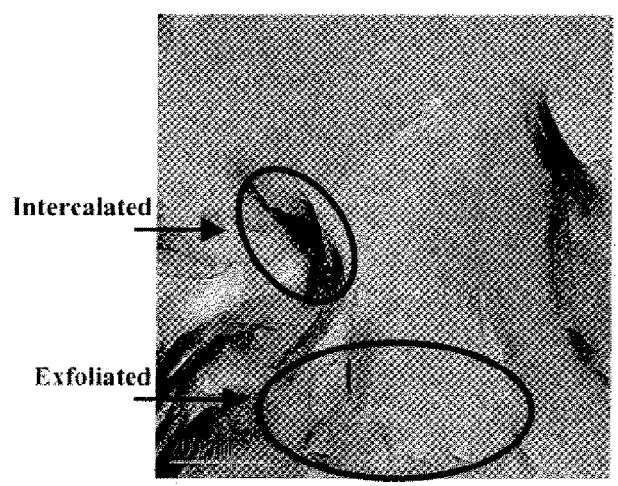
Figure 3C:
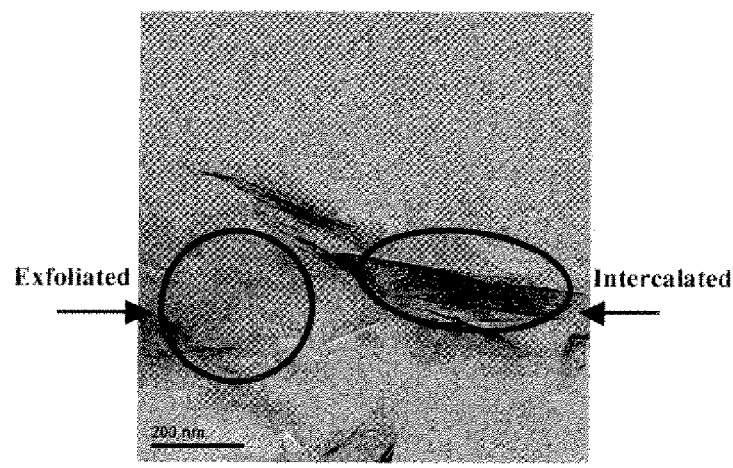

In addition to XRD, TEM was employed to identify the nature of silicate dispersion within each blend composition. Representative TEM images, FIGS. 3a-c, indicated mixed nanocomposite morphologies; where samples contained regions of both intercalated and exfoliated silicate layers. In FIG. 3(a), a TEM image is shown of a nanocomposite with an epoxy ratio of 70 aromatic to 30 alkoxy with clay concentration of 2 wt %. In FIG. 3(b) a TEM image is shown of a nanocomposite with an epoxy ratio of 70 aromatic to 30 alkoxy with a clay concentration of 5 wt %. In FIG. 3(c), a TEM image illustrates dispersion of 2 wt % Cloisite 30B in a nanocomposite with an epoxy ratio of 90 aromatic to 10 alkoxy. These figures show the level of dispersion and the areas where the clay is more separate than others.

Figure 4:
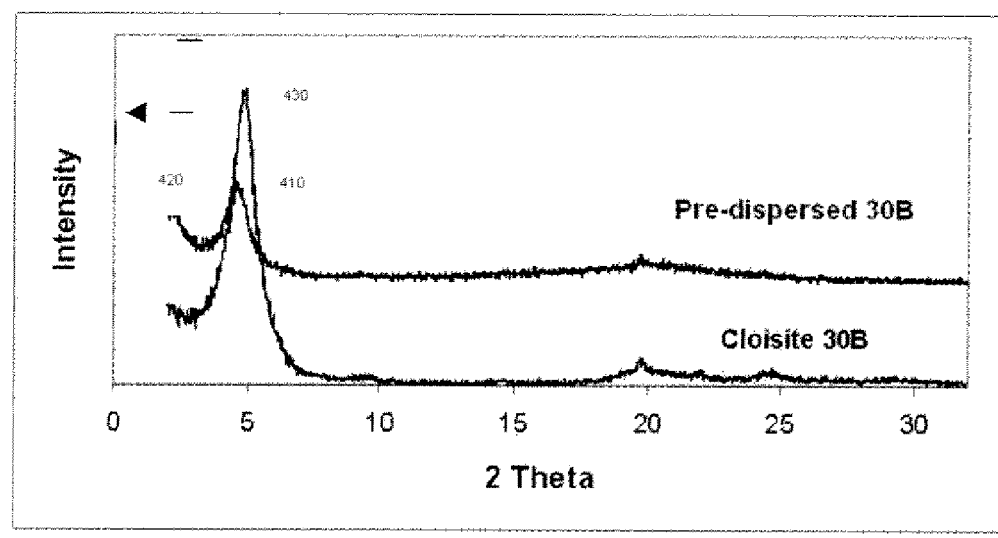
FIG. 4 is a chart of experimental data.

The XRD pattern of the pre-dispersed clay, FIG. 4, shows two diffraction peaks, 410 and 420. The peak at $2\theta=4.8°$, $d_{001}=1.7$ nm, 430, corresponded to the as-received Cloisite 30B. Following intercalation of the alkoxy component of the blend, the peak intensity decreased by approximately 50%, 410, and a second diffraction peak, 420, appeared at $2\theta=2.4°$, $d_{001}=3.4$ nm, corresponding to clay layers intercalated with the alkoxy component.

Figure 5:
FIG. 5 shows TEM photographs.
Figure 5:
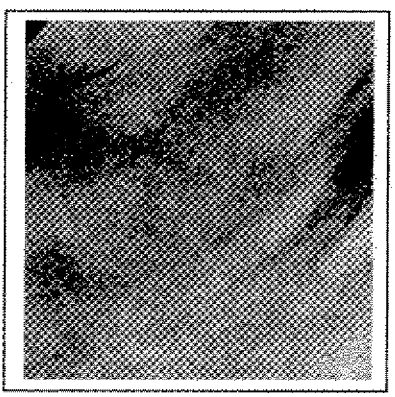

In FIG. 5(a), a TEM image is shown of a nanocomposite with an epoxy ratio of 70:30 with 2 wt % Cloisite 30B prepared by simple mixing. FIG. 5(b) shows the same composition material made by first pre-dispersing the Cloisite 30B in the alkoxy epoxy. Comparing the sample made by simple mixing shown in FIG. 5(a) with the sample made with the pre-dispersion step shown in FIG. 5(b), demonstrates that the pre-dispersion process yields a degree of layer separation comparable to, if not greater than, those prepared by simply mixing all the epoxy components.

Measured resin and nanocomposite $T_g$ values are listed in Table 2 where ratios correspond to aromatic:alkoxy.

TABLE 2

| Clay Content | $T_g$ (° C.) 90:10 | $T_g$ (° C.) 70:30 | $T_g$ (° C.) 50:50 |
|---|---|---|---|
| 0% clay | 63 +/− 2 | 32 +/− 2 | 0 +/− 1 |
| 2% 30B | 62 +/− 2 | 29 +/− 1 | −1 +/− 2 |
| 2% 30B (predispersed) | 67* | 41* | 0* |
| 5% 30B | 66 +/− 1 | 30 +/− 8 | −2 +/− 2 |
| 5% 30B (predispersed) | 65* | 45* | 0 +/− 3 |

*Data from one sample

The blend compositions with greater aromatic content generally resulted in a higher $T_g$. It was observed that the $T_g$ generally dropped following simple mixing of Cloisite 30B into the epoxy blends. For example, the clay offered little or no enhancement of $T_g$ for 90:10 or the 50:50 series of resins. Both, an increase in plasticization and a reduction in the crosslink density typically cause a decrease in $T_g$. Each of these are plausible contributors to the observed drop in $T_g$ with Cloisite 30B dispersion.

The effect of pre-dispersing the clay in the alkoxy component was to recover the initial $T_g$ drop. Pre-dispersion forced the clay into the more mobile component, thus reinforcing the regions that would contribute to overall lower $T_g$. In the case of the 70:30 blends, pre-dispersion unexpectedly pushed the $T_g$ higher than that of the base resin, and an overall increase of 9° C. was observed when 2 wt % clay was pre-dispersed and up to 13° C. was observed for the nanocomposite with 5 wt % pre-dispersed clay, shown in Table 2. When comparing the nanocomposite with the pre-dispersion step to the nanocomposite with clay added directly to the blend (not pre-dispersed) there was a 13° C. increase for 2 wt % addition and an increase of 15° C. for the 5 wt % clay addition.

Figure 6:
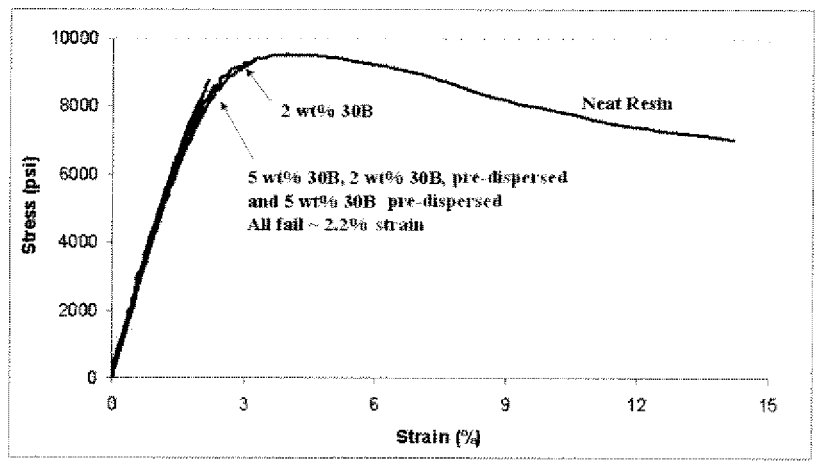
FIG. 6 is a chart of experimental data.
Figure 6:
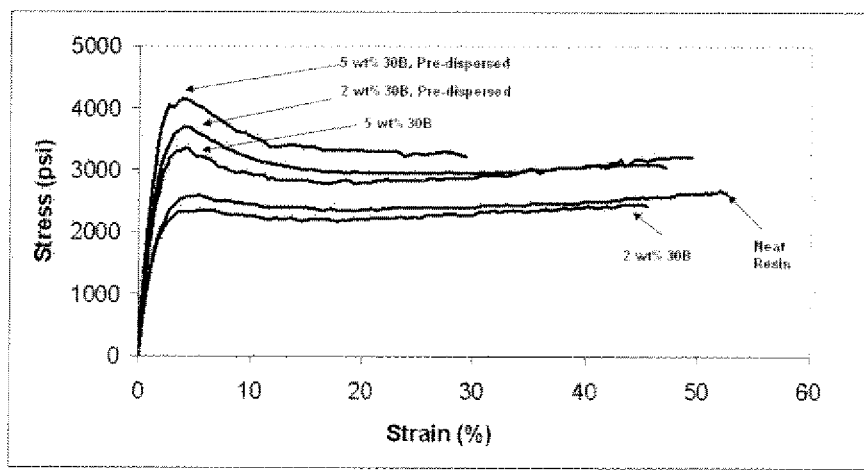

The yield stress ($\sigma_y$), Young's Modulus (E), and toughness of the silicate-epoxy nanocomposites were determined from stress strain curves, plotted following tensile tests. Sample plots are illustrated in FIGS. 6a and 6b, and the data from each plot is listed in Table 3.

blend with 5 wt % pre-dispersed Cloisite 30B. The difference in modulus between the samples containing 2 wt % clay, straight addition as compared to the samples with pre-dispersed clay was an increase of $1.3 \times 10^{-5}$ GPa and an increase of $1.7 \times 10^{-5}$ GPa for 5 wt % clay addition. In the 70:30 nanocomposite, placing the clay in the alkoxy component resulted in an 60% increase in modulus for the nanocomposite with 2 wt % pre-dispersed clay as compared to the base resin blend, without a corresponding decrease in toughness.

The yield stress also increased with increased aromatic or clay content; again with greater values of strength attained by pre-dispersion. Selectively placing the clay in the alkoxy component was also a significant benefit to the yield stress of most 70:30 nanocomposites made. Addition of 2 wt % pre-dispersed clay increased $\sigma_y$ over 40% without a corresponding decrease in toughness, relative to the base resin. Addition of 5 wt % pre-dispersed clay increased $\sigma_y$ by 63%; also without a significant change in the material toughness. The least dramatic influence was observed with the 90:10 resins. In this case, pre-dispersion of the clay had no effect on the overall properties. This may be attributed to the already low concentration of flexible component present in the system. Therefore, the $\sigma_y$ values of the nanocomposites in the 90:10 series are reduced relative to the base resin because these nanocomposites fail earlier than the base resin. It should be noted that the 50:50 resins also did not yield, therefore the yield stress represented the stress at failure.

In regards to toughness, the nanocomposites in the 50:50 series were rubbery at room temperature and only showed improved toughness when the clay was pre-dispersed in the alkoxy epoxy component. The nanocomposite toughness increased despite the increase of strength and modulus, as evidenced by an increase of 30 MPa for the 2 wt % pre-dispersed nanocomposite and 25 MPa for the 5 wt % pre-dispersed nanocomposite, which is more than a 100% overall increase in calculated toughness resulting in a stronger/stiffer composite.

In general, the mechanically weaker, rubbery regions improved with clay addition to a greater extent than the more rigid, glassy, materials, in terms of strength, modulus, and toughness. Therefore, pre-dispersing offered the greatest

TABLE 3

| Clay Content | $\sigma_y$ (MPa) 90:10* | $\sigma_y$ (MPa) 70:30 | $\sigma_y$ (MPa) 50:50* | E (GPa) 90:10 | E (GPa) 70:30 | E (GPa) 50:50 | Toughness (MPa) 90:10 | Toughness (MPa) 70:30 | Toughness (MPa) 50:50 |
|---|---|---|---|---|---|---|---|---|---|
| 0% clay | 67 +/− 1 | 18 +/− 0.1 | 1 +/− 0.1 | 0.031 +/− $4 \times 10^{-4}$ | $7 \times 10^{-3}$ +/− $4 \times 10^{-4}$ | $6 \times 10^{-5}$ +/− $7 \times 10^{-6}$ | 765 +/− 138 | 875 +/− 62 | 23 +/− 2 |
| 2% 30B | 66 +/− 1 | 18 +/− 0.5 | 2 +/− 0.1 | 0.031 +/− $7 \times 10^{-4}$ | $7 \times 10^{-3}$ +/− $1.2 \times 10^{-3}$ | $7.6 \times 10^{-5}$ +/− $7 \times 10^{-6}$ | 131 +/− 14 | 703 +/− 28 | 21 +/− 2 |
| 2% 30B (pre-dispersed) | 60** | 25 +/− 1 | 2 +/− 0.1 | 0.032** | $1.1 \times 10^{-2}$ +/− $1.1 \times 10^{-3}$ | $8.9 \times 10^{-5}$ +/− $1 \times 10^{-5}$ | 69** | 986 +/− 76 | 51 +/− 3 |
| 5% 30B | 58 +/− 2 | 23 +/− 0.2 | 2 +/− 0.1 | 0.033 +/− $5 \times 10^{-4}$ | $1.1 \times 10^{-2}$ +/− $1.1 \times 10^{-3}$ | $8.3 \times 10^{-5}$ +/− $1 \times 10^{-5}$ | 83 +/− 14 | 1000 +/− 28 | 29 +/− 3 |
| 5% 30B (pre-dispersed) | 53 +/− 3 | 29 +/− 0.9 | 3 +/− 0.1 | 0.032 +/− $7 \times 10^{-4}$ | $1.4 \times 10^{-2}$ +/− $1.2 \times 10^{-3}$ | $1.0 \times 10^{-4}$ +/− $7 \times 10^{-6}$ | 62 +/− 7 | 683 +/− 103 | 54 +/− 7 |

*Stress at failure.
**Data from one sample due to air bubbles within the material.

In general, resin modulus increased with either increased aromatic content or increased clay content. For example the highly aromatic 90:10 nanocomposite has a much higher modulus, $3.1 \times 10^{-2} \pm 4 \times 10^{-4}$ GPa, as compared to $6 \times 10^{-5} \pm 7 \times 10^{-6}$ GPa for the lower aromatic, 50:50 nanocomposite. However, up to 67% increase in modulus was also observed in the 50:50 blend when comparing the base resin blend to the resin benefit in mechanical properties to systems which were initially rubbery, or mechanically weaker than a similar glassy system. The materials with higher $T_g$ values have stronger chemical bonds and while these materials still showed improved properties with clay additions, the enhancements were not as significant as seen in the rubbery materials with the lower $T_g$s.

Figure 7:
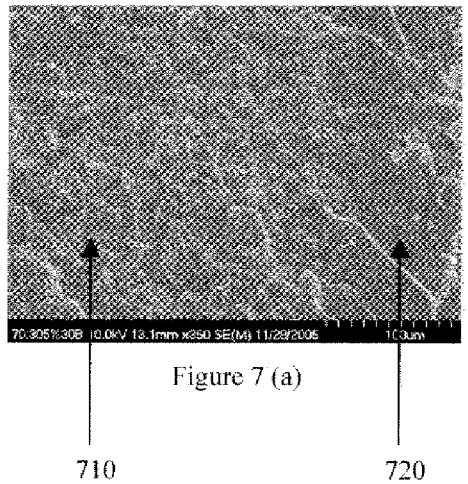
FIG. 7 shows SEM photographs.
Figure 7:
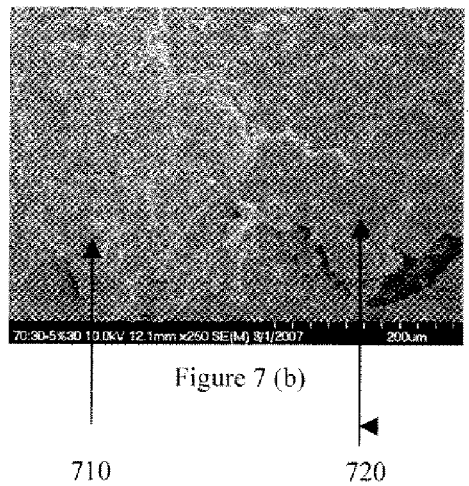

The single $T_g$ reported within each system indicated a miscible system. Correspondingly, macrophase separation within these blends was not observed by SEM. However, the results collected did suggest a level of phase separation, which allowed for manipulation of the material properties. For example, the 70:30 blend contained 2.3 times, by weight, the amount of aromatic component over alkoxy; (2× by volume). While the flexible (alkoxy) component was likely well integrated into the blend, there would remain large regions composed solely of the aromatic component. As such, an affinity between the silicate clay and the aromatic segment which pulled the clay into these regions would render the flexible component deficient in clay content. The SEM images in. FIGS. 7(a) and 7(b) show distinct regions of the 70:30 blend containing significant quantities of clay, 710, while adjacent regions of the blend are essentially absent of clay, 720.

Figure 8:
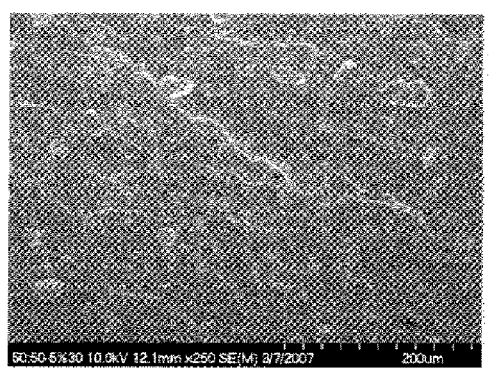
FIG. 8 shows SEM photographs, Nanocomposite compositions with equivalent epoxy ratios of 90:10, 70:30 and 50:50, aromatic epoxy to alkoxy epoxy, respectively, were prepared. Clay was added to yield concentrations of 2 wt % or 5 wt % clay based on the final nanocomposite weight.
Figure 8:
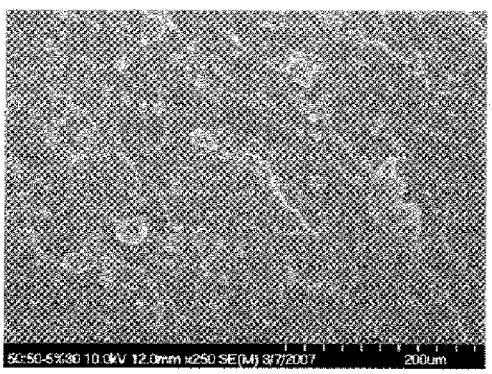

The 50:50 series contained nearly equal quantities of both aromatic and alkoxy components. In this case, SEM images in FIGS. 8(a) and 8(b), show much greater homogeneity in the dispersion of the silicate clay, relative to the 70:30 blend of FIG. 7. The disparity in silicate distribution within the 70:30 system had significant influence in the nanocomposite properties, and allowed manipulation of those properties by selectively placing the clay in the alkoxy region.

Significant benefit from pre-dispersion was observed within the mechanical property data. In this case, positioning the silicate reinforcement within the flexible component allowed improved mobility of the clay, translating into improved composite strength and modulus.

Evidence that the clay did reside in a specific region of the blend was provided by SEM images. Furthermore, the increase in $T_g$ on pre-dispersing the clay suggested that the clay restricted epoxy chain motion within the mobile component of the blend. Tensile test data from the epoxy blends revealed that the mobility of the silicate layers within the matrix offered improved resin toughness. This was seen by the improved toughness and significant enhancement in strength within the pre-dispersed 50:50 resins, relative to other resins in the series which are glassy at room temperature.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on provided herein. And while several examples have been provided at different epoxy ratios (70:30 vs 50:50), it should be evident to one skilled in the art that Applicant is also claiming mixtures comprising an equivalent ratio between 70:30 and 50:50 of aromatic epoxy to alkoxy epoxy or aliphatic epoxy, respectively. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

As used herein, "connection" or "connected" means both directly, that is, without other intervening elements or components, and indirectly, that is, with another component or components arranged between the items identified or described as being connected. To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Similarly, when the applicants intend to indicate "one and only one" of B, or C, the applicants will employ the phrase "one and only one". Thus, use of the term "or" herein is the inclusive, and not the exclusive use. See, Bryan A. Garner, A Dictionary of Modern Legal Usage 624 (2d. Ed. 1995).

What is claimed is:

1. A method of preparing a toughened clay-epoxy nanocomposite comprising:
    dispersing a clay in a flexible polyalkylene oxide based epoxy to form a toughening flexible component;
    combining the toughening flexible component with a rigid aromatic epoxy to form a toughened clay-epoxy blend;
    subsequently stirring the toughened clay-epoxy blend;
    subsequently cooling the toughened clay-epoxy blend;
    subsequently adding a curing agent to the toughened clay-epoxy blend to form a curable composition;
    degassing the curable composition; and
    curing the curable composition to form a toughened clay-epoxy nanocomposite.

2. The method as set forth in claim 1, where the toughened clay-epoxy blend is stirred for three hours.

3. The method as set forth in claim 1, where the curable composition is degassed at a first temperature.

4. The method as set forth in claim 3, where the first temperature is at least 40° C.

5. The method as set forth in claim 3, where the curable composition is cured according to a curing protocol, where the curing protocol includes heating at a second temperature for a period of time and heating at a third temperature for a period of time.

6. The method as set forth in claim 5, where the second temperature is greater than the first temperature and the third temperature is greater than the second temperature.

7. The method as set forth in claim 1, where the toughened clay-epoxy blend features an epoxy equivalent ratio of the rigid aromatic epoxy to the flexible polyalkylene oxide based epoxy between 70:30 and 50:50.

8. A method of preparing a curable composition comprising:
    dispersing a clay in a flexible polyalkylene oxide based epoxy to form a toughening flexible component;
    combining the toughening flexible component with a rigid aromatic epoxy to form a toughened clay-epoxy blend, wherein the toughened clay-epoxy blend features an epoxy equivalent ratio of the rigid aromatic epoxy to the flexible polyalkylene oxide based epoxy between 70:30 and 50:50;
    subsequently stirring the toughened clay-epoxy blend; and
    subsequently adding a curing agent to the toughened clay-epoxy blend to form a curable composition.

9. The method as set forth in claim 8, further comprising degassing the curable composition at a first temperature.

10. The method as set forth in claim 9, where the first temperature is at least 40° C.

11. A method of preparing a toughened clay-epoxy nanocomposite comprising: preparing a curable composition according to the method as set forth in claim 9; and curing the curable composition according to a curing protocol to form a toughened clay-epoxy nanocomposite, where the curing protocol includes heating at a second temperature for a period of time and heating at a third temperature greater than the second temperature for a period of time.

* * * * *